(12) United States Patent
Hudson et al.

(10) Patent No.: US 12,188,960 B2
(45) Date of Patent: Jan. 7, 2025

(54) ACTIVE NOISE ISOLATION FOR TUNNELING APPLICATIONS (ANITA)

(71) Applicant: The Penn State Research Foundation, University Park, PA (US)

(72) Inventors: Eric Hudson, State College, PA (US); Lavish Pabbi, Hillsboro, OR (US)

(73) Assignee: The Penn State Research Foundation, University Park, PA (US)

( * ) Notice: Subject to any disclaimer, the term of this patent is extended or adjusted under 35 U.S.C. 154(b) by 1124 days.

(21) Appl. No.: 16/964,453

(22) PCT Filed: Jan. 24, 2019

(86) PCT No.: PCT/US2019/014926
§ 371 (c)(1),
(2) Date: Jul. 23, 2020

(87) PCT Pub. No.: WO2019/147788
PCT Pub. Date: Aug. 1, 2019

(65) Prior Publication Data
US 2021/0025919 A1    Jan. 28, 2021

Related U.S. Application Data

(60) Provisional application No. 62/622,253, filed on Jan. 26, 2018.

(51) Int. Cl.
*G01Q 70/04* (2010.01)
*G01Q 20/00* (2010.01)
(Continued)

(52) U.S. Cl.
CPC ............ *G01Q 70/04* (2013.01); *G01Q 20/00* (2013.01); *G01Q 30/06* (2013.01); *G01Q 60/16* (2013.01)

(58) Field of Classification Search
CPC ...... B82Y 35/00; B82B 3/0004; G01Q 70/04; G01Q 20/00; G01Q 20/04; G01Q 30/06;
(Continued)

(56) References Cited

U.S. PATENT DOCUMENTS 4,894,537 A    1/1990  Blackford et al.
5,274,230 A *  12/1993 Kajimura ............... B82Y 35/00
                                                  977/869
(Continued)

FOREIGN PATENT DOCUMENTS

EP         1843295 B1      11/2017

OTHER PUBLICATIONS

Liu H, Meng Y, Zhao HW, Chen DM. Active mechanical noise cancellation scanning tunneling microscope. Rev Sci Instrum. Jul. 2007;78(7):073705. doi: 10.1063/1.2755399. PMID: 17672764. (Year: 2007).*

(Continued)

*Primary Examiner* — Lisa M Caputo
*Assistant Examiner* — Eric Sebastian Von Wald
(74) *Attorney, Agent, or Firm* — DINSMORE & SHOHL LLP

(57) ABSTRACT

An active noise isolation apparatus and method for cancelling vibration noise from the probe signal of a scanning tunneling microscope by generating a correction signal by convolution based on the probe signal and the sensor signal, which is based on the ambient vibration that adds noise to the probe signal.

20 Claims, 8 Drawing Sheets

(51) Int. Cl.
  *G01Q 30/06* (2010.01)
  *G01Q 60/16* (2010.01)
(58) Field of Classification Search
  CPC ...... G01Q 60/16; G01Q 10/065; G01Q 60/10;
       G01Q 80/00; G01Q 70/02; G01Q 60/12;
       G01Q 60/14; G01Q 10/00; G01Q 10/04;
       G01Q 70/18; G01Q 10/06; H01J
       2237/2818; H02N 2/028; Y10S 977/861
  See application file for complete search history.

(56) References Cited

U.S. PATENT DOCUMENTS

| | | | |
|---|---|---|---|
| 5,391,871 A * | 2/1995 | Matsuda | G01Q 60/16 977/869 |
| 5,543,614 A * | 8/1996 | Miyamoto | G01Q 70/04 977/851 |
| 6,043,490 A | 3/2000 | Sakai | |
| 6,359,370 B1 * | 3/2002 | Chang | H10N 30/206 310/330 |
| 7,249,002 B1 | 7/2007 | Ben-Dov et al. | |
| 7,598,492 B1 | 10/2009 | Krzeczowski et al. | |
| 8,220,066 B2 | 7/2012 | Humphris | |
| 8,448,502 B2 * | 5/2013 | Jesse | G01Q 10/06 850/4 |
| 9,800,787 B2 | 10/2017 | Ozluturk | |
| 2011/0191917 A1 * | 8/2011 | Abramovitch | G01Q 10/065 850/1 |
| 2017/0163897 A1 | 6/2017 | Ozluturk | |
| 2017/0350920 A1 * | 12/2017 | Ikeda | G01Q 30/18 |
| 2018/0100875 A1 * | 4/2018 | Moheimani | G05D 3/1454 |

OTHER PUBLICATIONS

Wikipedia Contributor (Ed.). (Jan. 2, 2018). Nyquist-Shannon sampling theorem. Nyquist-Shannon sampling theorem—Wikipedia. https://web.archive.org/web/20180102210031/https://en.wikipedia.org/wiki/Nyquist%E2%80%93Shannon_sampling_theorem (Year: 2018).*
International Search Report dated Apr. 12, 2019; International Application No. PCT/US2019/014926.
Calibration of Accelerometer Vibration Sensitivity by Reference by Chris Vogler dated Apr. 5, 2015; 10 pages.
A new solution for shock and vibration calibration of accelerometers by Marco Peres and Robert D. Sill; 9 pages.

* cited by examiner

ACTIVE NOISE ISOLATION FOR TUNNELING APPLICATIONS (ANITA)

CROSS-REFERENCE TO RELATED APPLICATIONS

This application is the U.S. national stage of PCT/US2019/014926 filed Jan. 24, 2019, which claims priority to U.S. Provisional Patent Application Ser. No. 62/622,253, filed Jan. 26, 2018, the entire content of both are incorporated herein by reference in their entirety.

GOVERNMENT SUPPORT

This invention was made with government support under Grant No. DMR1229138 awarded by the National Science Foundation. The Government has certain rights in the invention.

FIELD OF THE INVENTION

The present invention generally relates to surface analysis instruments and more specifically to an active noise isolation setup for Scanning Probe Microscopy Applications.

BACKGROUND OF THE INVENTION

The extreme sensitivity of a Scanning Tunneling Microscope (STM) to small displacements, while allowing it to extract electronic information from materials with sub-angstrom level precision, also makes it highly sensitive to the external mechanical and acoustic noise and vibration. The source of this strength and vulnerability is the exponential dependence of the tip-current (I) on the tip-sample junction separation. Any ambient vibration, which drives relative motion between the tip and sample, will thus either create noise in the current signal, or if constant-current feedback is operating, in the position feedback signal (Z).

Typical efforts to eliminate this noise focus on the structural design of the instrument, often by making the tip-sample junction as stiff as possible (resonance frequencies in the 1-10 kHz range) while supporting the system on multiple soft-spring isolation stages (resonance frequencies in the 1-10 Hz range).[1-11] Even with these efforts, highly sensitive instruments typically require a very quiet lab environment. This makes it difficult to use active refrigeration techniques, like pulse tube cryocoolers, as well as to combine the STM into an instrumentation suite with sample preparation and other characterization tools. A variety of other vibration cancellation systems have been developed, both for STMs[12-21] and for other vibration sensitive instrumentation[22-33], yet none have been widely adopted, likely because of their complexity, expense, or narrow range of use. Thus, it is desirable to overcome the limitations of the existing vibration cancellation systems and to provide a better solution.

SUMMARY OF THE INVENTION

The present invention provides an active noise isolation apparatus and method i.e. Active Noise Isolation for Tunneling Applications (ANITA)[34], which relies on existing tip positioning technology to stabilize the tip-sample junction, but moves the signal associated with this motion out of the main current-z feedback loop by correlating it with accelerometer measurements of the system motion. This low cost, easy to implement system requires no physical modification of the instrument aside from the addition of an accelerometer at some position that can capture either the cause or effect of troublesome vibrations, and thus can be quickly added to existing systems with immediate impact. Although initially designed for STMs, it is broadly applicable to any system where a displacement cancelling feedback system is already in place, for example, for scanning probe microscopy (SPM) systems in general. Thus, a person skilled in the art should be able to use the active noise isolation apparatus and method discussed herewith in regards to a scanning tunneling microscope for cancelling vibrations in other SPM systems.

An embodiment of a scanning tunneling microscope has a sample holder for holding a sample with a surface; a probe operable to provide a probe signal based on the surface of the sample disposed on the sample holder; a sensor generating a sensor signal based on an ambient vibration; and a processing unit generating a correction signal by convolution based on the probe signal and the sensor signal. The ambient vibration causes a relative motion between the probe and the sample surface, and the relative motion due to the ambient vibration adds noise to the probe signal. The processing unit removes noise from the probe signal by applying the correction signal to the probe signal.

The sensor may be attached to the probe and/or the sample holder. In some embodiments, the sensor is selected from the group of an accelerometer, velocity sensor, proximity sensor and laser displacement sensor. In some embodiments, the sensor is disposed at a location that is spaced from a location of the probe, sample holder and/or the surface of the sample. In some examples, the distance between the sensor and the probe may vary from few inches to several feet depending on the location of and/or distance between the probe and the source of vibration. In some embodiments, the sensor comprises a plurality of sensors located at different sources of vibrations affecting the probe. Each of the plurality of sensors provide data to the processing unit. These sensors may communicate periodically or continuously with the processing unit. The sensor may not be physically attached or connected with the probe, sample holder and/or the surface of the sample. The sensor may be placed at any location on the instrument chamber comprising the probe and sample holder, or even, for example, on the adjacent floor, as long as vibrations associated with the motion to be removed from the signal are detectable. The sensor may generate the sensor signal based on the ambient vibration having a variable frequency and/or amplitude. Some embodiments of the scanning tunneling microscope measurements include a constant tip-current or constant tip-height based scan, and the processing unit of these embodiments, respectively, generate the correction signal for the constant tip-current or constant tip-height based scanning tunneling microscope measurements.

In some embodiments of the scanning tunneling microscope, the sensor detects a highest frequency of the ambient vibration and the processing unit generates the correction signal using a discrete algorithm that is run by the processing unit at a frequency that is at least twice the highest frequency of the ambient vibration. The ambient vibration may have a plurality of frequencies and amplitudes, and the sensor generates the sensor signal based on the ambient vibration having the plurality of frequencies and amplitudes. In such embodiments, the processing unit generates the correction signal by simultaneously convolving the sensor signal having the plurality of frequencies and amplitudes of the ambient vibration.

According to some embodiments of the scanning tunneling microscope, the processing unit removes noise of the ambient vibration that corresponds to a plurality of axes along the probe, sample holder and/or the surface of the sample. The scanning tunneling microscope may have a processing unit that generates the correction signal using digital signal processing. In some scanning tunneling microscopes, the processing unit does not generate the correction signal using analog signal processing.

A method of active noise isolation for a scanning tunneling microscope has the steps of: providing the scanning tunneling microscope according to this disclosure; providing the probe signal from the probe based on the surface of the sample disposed on the sample holder; generating the sensor signal from the sensor based on the ambient vibration, the ambient vibration causing a relative motion between the probe and the sample surface, and the relative motion due to the ambient vibration adding noise to the probe signal; generating the correction signal from the processing unit by convolution based on the probe signal and the sensor signal; and removing the noise of the ambient vibration from the probe signal using the processing unit by applying the correction signal to the probe signal.

In some method embodiments, the step of generating the correction signal includes continuous or periodical monitoring of an amplitude and/or frequency of the ambient vibration to remove the noise. The step of generating the sensor signal may be based on the ambient vibration having a plurality of frequencies and amplitudes. In some method embodiments, during the step of generating the correction signal, the processing unit simultaneously convolves the plurality of frequencies and amplitudes of the ambient vibration. The method embodiments may further include a step of detecting a highest frequency of the ambient vibration, wherein the step of generating the correction signal comprises running a discrete algorithm at a frequency that is at least twice the highest frequency of the ambient vibration.

The step of providing the scanning tunneling microscope in the method embodiment may include providing the sensor comprising a plurality of sensors. The method embodiment may have the step of generating the correction signal that comprises generating one or more kernels for each frequency in the ambient vibration for convolution.

BRIEF DESCRIPTION OF DRAWINGS

The accompanying drawings, which are included to provide a further understanding of the invention and are incorporated in and constitute a part of this application, illustrate embodiment (s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

As noted above, the high sensitivity of scanning probe microscopes poses a barrier to their use in a noisy environment. Vibrational noise, whether structural or acoustic in source, can manifest as relative motion between the probe tip and the sample, which then appears in a probe position ("Z") feedback as it tries to cancel this motion. This disclosure describes an active noise cancellation process that nullifies the appearance of this vibration by adding a drive signal into the existing Z-feedback loop. The drive signal is digitally calculated by actively monitoring vibrations using an accelerometer. Some embodiments according to the present invention may use other sensors, such as velocity sensors, proximity probes, or laser displacement sensors, for monitoring vibrations. By transferring the vibration cancellation effort to the drive signal, vibration-created noise in the Z-feedback (during topography) or current (during spectroscopy) is significantly reduced. This inexpensive and easy solution, requiring no major instrumental modifications, is useful for those looking to place their STM in a noisier environment, for example, in the presence of active refrigeration systems (e.g. pulse tube cryocoolers) or high-vibration instrumentation.

This disclosure outlines, but is not limited to, the basic setup of the active noise isolation technique, the theoretical basis of the algorithm developed for the process, implications of using a discrete process algorithm and examples of its use.

I. Basic Experimental Setup and Performance

Figure 1A:
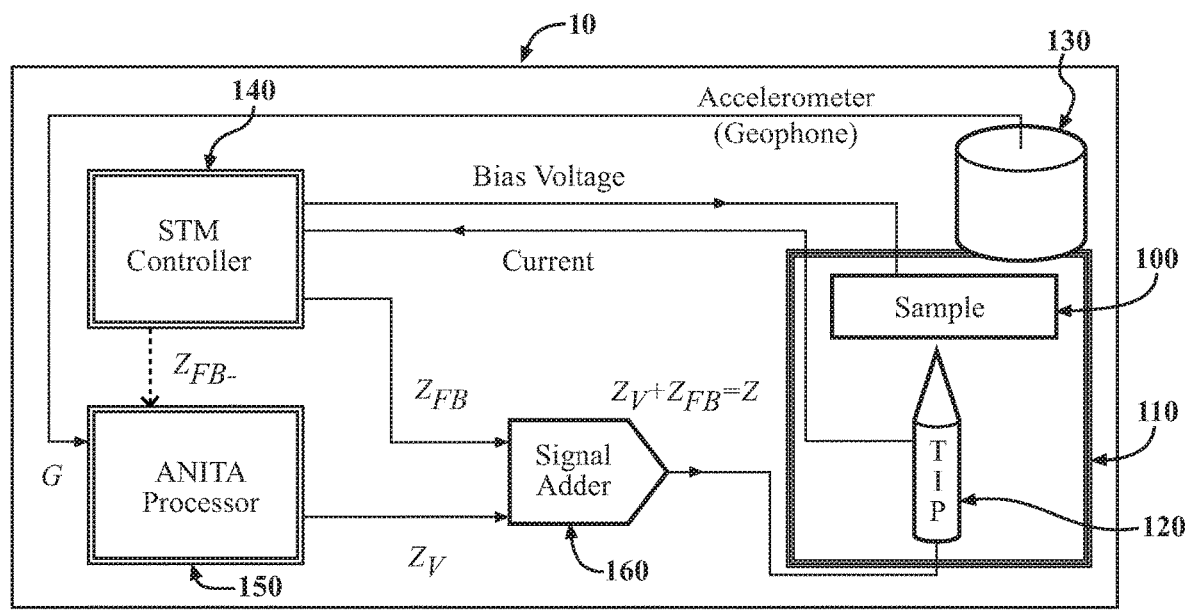
FIG. 1*a* is a schematic illustration of a scanning tunneling microscope with ANITA.

FIG. 1*a* is a schematic of a scanning tunneling microscope 10 with an Active Noise Isolation for Tunneling Applications (ANITA) 150, where a primary addition to the standard STM 10 setup involves a geophone[35] 130 (accelerometer) for sensing mechanical vibrations (signal G). A typical SPM 10 maintains separation between tip 120 and sample 100 via Z-feedback ($Z_{FB}$), generated in the controller 140. According to this disclosure, geophone 130 is added to the typical SPM 10. Signal G from the geophone 130 is correlated with $Z_{FB}$ during a calibration step (dashed line), and then used to generate a Z vibration signal ($Z_V$). Adding $Z_V$ to $Z_{FB}$ thus transfers the burden of cancelling vibrations from the controller 140 to ANITA 150.

The sample 100 having a surface is placed on a sample holder 110. The probe/tip 120 is used to analyze the surface of the sample 100. It should be noted that ANITA's effectiveness is relatively insensitive to the position of the geophone 130, and the geophone 130 may be used in-situ, i.e. close to the STM 10, or ex-situ. In one ex-situ example, the geophone is spaced from the sample 100 and tip 120 by at least few inches. The signal G should contain a signal associated with (be sensitive to) the vibrations one wishes to cancel. In some embodiments, the geophone/sensor 130 may represent a plurality of sensors/geophones. The operation of ANITA 150 is a two-step process. In the first step, the signal from the geophone 130, as well as the STM controller 140 Z-feedback ($Z_{FB-}$) signal, are fed for training into the ANITA Digital Signal Processor 150 e.g. National Instruments PCI-6221 Multifunctional I/O card controlled by LabView[36]. After a brief training phase (calibration), ANITA 150 uses a real time digital analysis of G to create a vibration control signal $Z_V$. When added to the ($Z_{FB}$) signal from the controller 140 using a low noise signal adder circuit[37] 160, the relative tip-sample motion is segmented into vibration ($Z_V$) and actual signal ($Z_{FB}$).

In some embodiments, the STM controller 140 may have one or more processors (i.e. processing units) for providing the Z-feedback ($Z_{FB-}$) signal. The scanning tunneling microscope 10 may have sub-parts/sub-units that have their respective processing units for performing various functions not discussed herein. Unlike ANITA processor 150, the STM controller 140 may have analog as well as digital components.

Figure 1B:
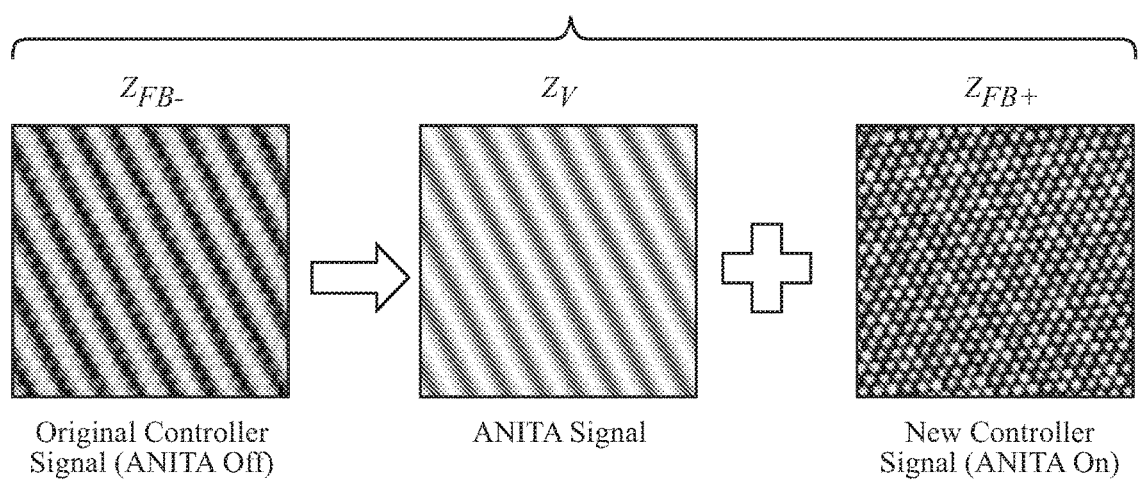
FIG. 1*b* is a model segmentation of a topography with an ANITA signal.

FIG. 1b shows a model segmentation of a topography taken with vibration cancellation off ($Z_{FB-}$) into $Z_V$ and a vibration-free feedback signal $Z_{FB+}$. FIG. 1b pictorially represents the underlying process functioning of ANITA and is not based on actual measurements. A topography of a signal from the STM controller 140 (i.e. vibration cancellation off ($Z_{FB-}$)) is segmented into the ANITA determined vibration control signal $Z_V$ and a now (ANITA on) "vibration-free" feedback signal $Z_{FB+}$.

Figure 2A:
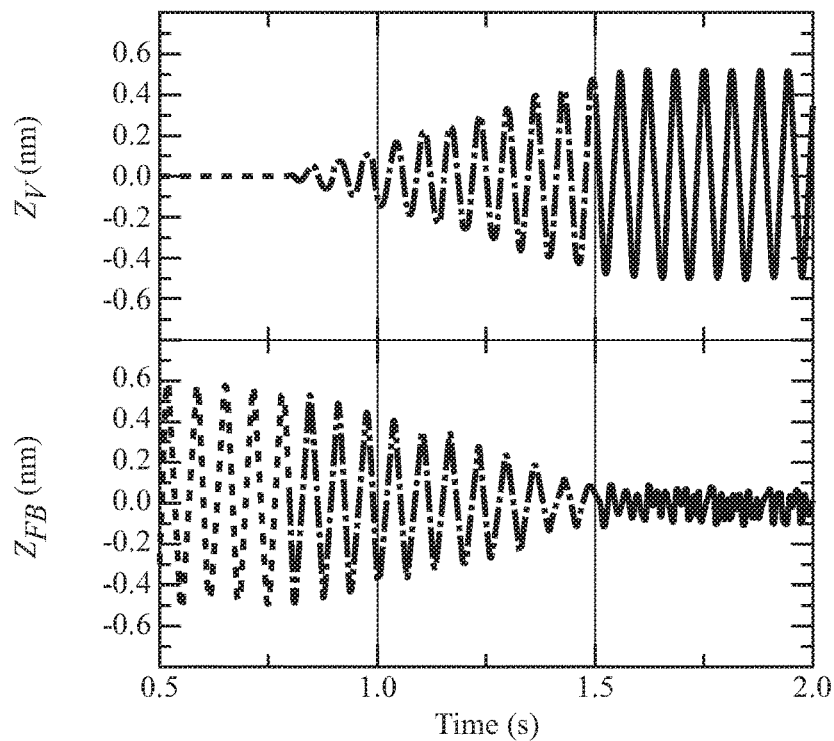
FIG. 2*a* is a signal chart depicting a vibration signal transfer.
Figure 2B:
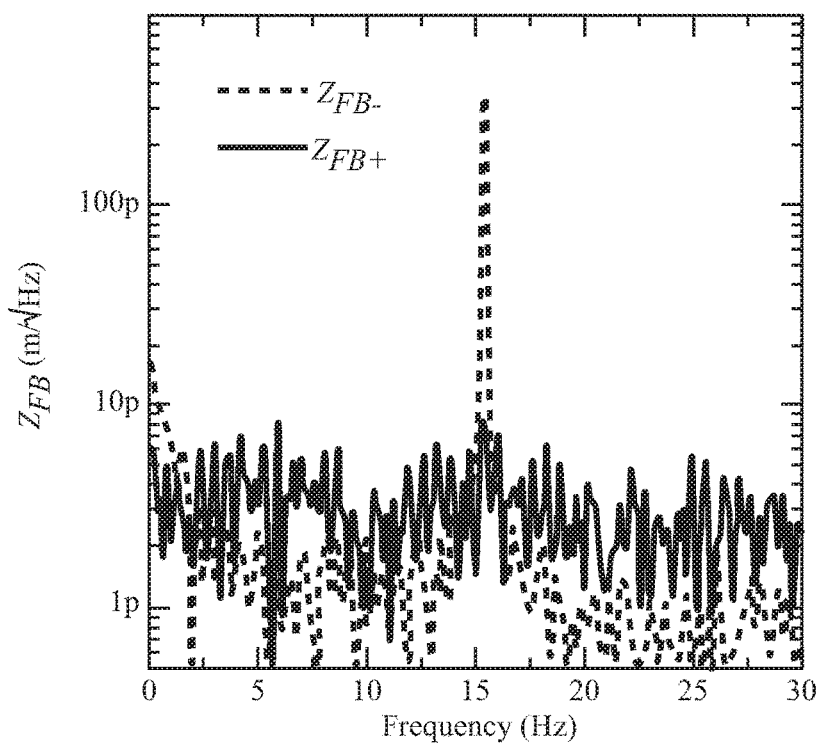
FIG. 2*b* is a graphical representation of a power spectrum for a feedback signal.

FIGS. 2a and 2b demonstrate experimental results of ANITA's performance, wherein FIG. 2a is a signal chart depicting vibration signal transfer and FIG. 2b graphically represents a power spectrum of the feedback signal. Initially, the system is driven with a single frequency vibration source by mounting a fan, mass-loaded on one side, near the STM chamber 10. The frequency of vibrations is varied by tuning the loaded motor DC drive voltage and the amplitude is varied by varying the load mass. The frequency of vibrations is tuned to be clearly observable without damaging the tip 120. Measurements are made at room temperature with a Pt—Ir tip on a gold sample 100 in constant current feedback. In FIG. 2a, a signal associated with the vibrations are observed in the $Z_{FB}$ signal when ANITA vibration cancellation is off ($Z_{FB-}$), and is gradually shifted to $Z_V$ as the cancellation becomes effective. The upper section of FIG. 2a shows a change in signal $Z_V$ with respect to time. The lower section of FIG. 2a shows that as the control signal $Z_V$ becomes effective, the vibration noise is removed from the $Z_{FB}$ signal. FIG. 2b shows a plot of $Z_{FB-}$ and $Z_{FB+}$ with respect to frequency. This power spectrum of the feedback signal shows suppression of the corresponding vibration peak.

Figure 3:
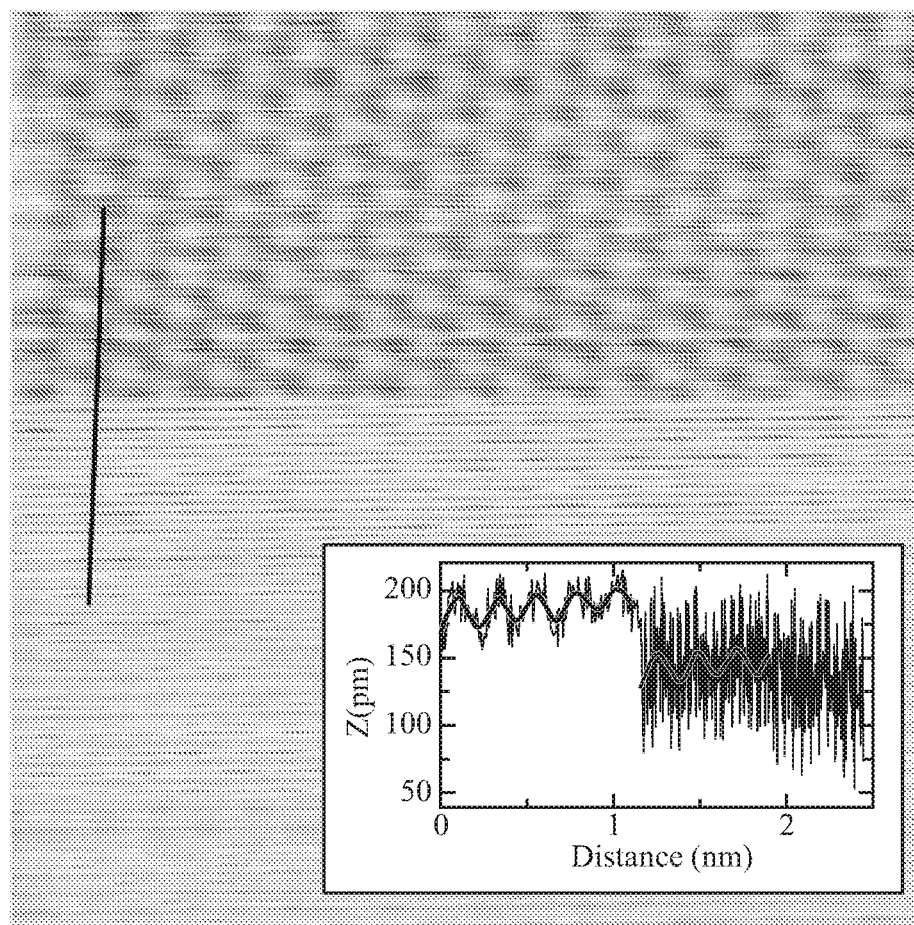
FIG. 3 is an image of ANITA's performance with an inset plot of $Z_{FB}$ verses distance.

To demonstrate the application and reliability of ANITA, its performance was tested using the Nanonis[38] controlled home-built STM system while conducting a constant current topography scan on Highly Ordered Pyrolytic Graphite (HOPG). HOPG is a standard sample used for STM calibration and atomic resolution performance tests. With mechanical vibrations present, the tip was brought into tunneling and held fixed relative to the sample using constant current Z-feedback, allowing calibration using G and $Z_{FB-}$ signals. ANITA was then enabled. FIG. 3 depicts ANITA's performance in the upper section of the image during the initial part of the scan where it reduces the effect of the vibrations. When ANITA is turned off, about midway down the scan, vibrations must again be handled by the STM controller, and thus reappear in the Z topography. The reappearance of the vibrations is noticeable in the lower section of the FIG. 3. A constant current STM image ($Z_{FB}$(x, y); $I_{set}$=100 pA, $V_B$=100 mV) shows the effect of switching from ANITA on (upper section) to off (lower section). An inset in FIG. 3 shows a plot of $Z_{FB}$ verses the tip's position along the vertical line spanning from the upper section to the lower section of FIG. 3. The inset highlights roughly a 10-fold reduction in the vibration-related signal, as atomic corrugations initially visible in the upper section are obscured by vibrations after ANITA is shut off, i.e. the vibrations in the tip signal reappear once ANITA is shut off.

II. Signal Processing Algorithm

An important part of ANITA's operation is a processing algorithm that generates $Z_V$ from G. For this, continuous convolution of G is used with a kernel, S. This leads, using the convolution theorem,[39] to the following relation (where * denotes convolution)[14]:

$$Z_V \equiv S*G = \mathcal{F}^{-1}[\mathcal{F}(G) \cdot \mathcal{F}(S)] \quad (1)$$

Figure 4:
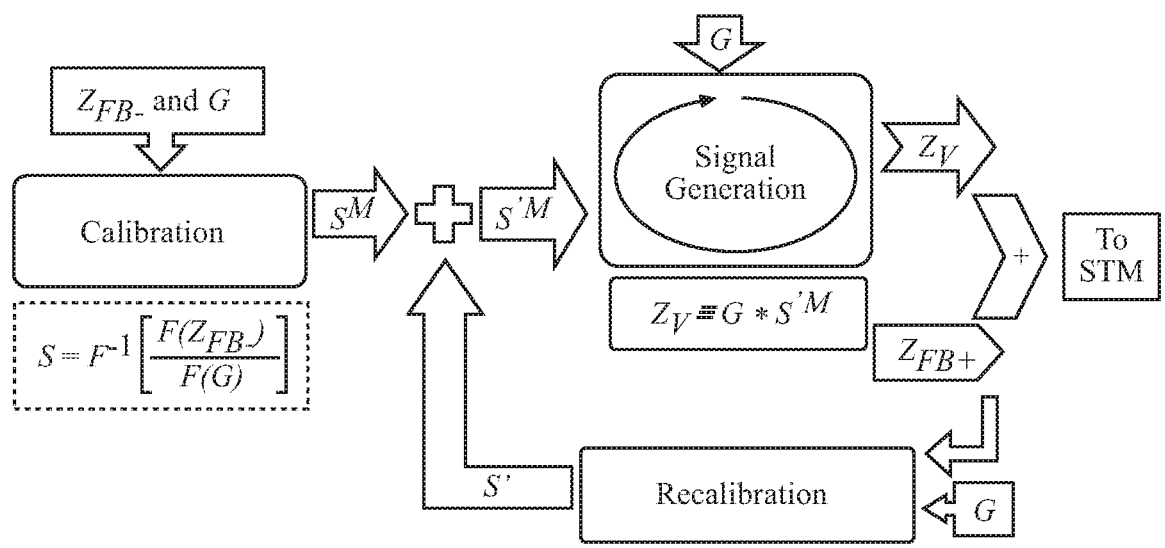
FIG. 4 is a flowchart for a calibration/recalibration routine.

FIG. 4 is a program flow chart for a calibration/recalibration routine. The calibration routine (left) creates multiple kernels S for different frequencies, and sums these multiple kernels S to obtain "mega-kernel" $S^M$. During operation (right-top) of the STM, this is continuously convolved with incoming G to generate $Z_V$, which, when added to the feedback signal $Z_{FB+}$, removes a large fraction of vibration-related noise. If necessary, recalibration (right-bottom) can be used to further push vibration-related signals from the feedback $Z_{FB+}$ to $Z_V$. The full processing algorithm consists at least of three distinct steps, as indicated schematically in FIG. 4 and outlined below.

Figure 5A:
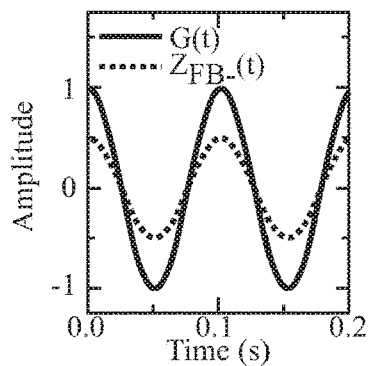
FIGS. 5*a*-5*g* are graphs showing ANITA's signal generation routines.
Figure 5B:
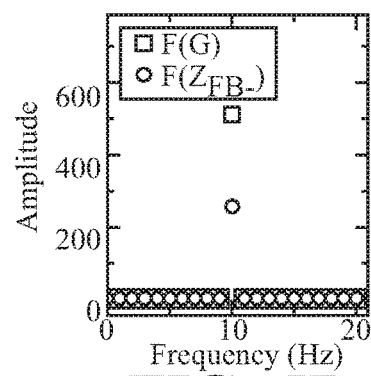
Figure 5C:
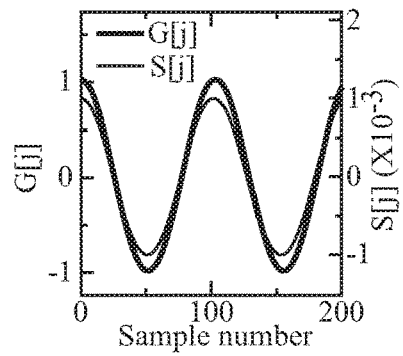
Figure 5D:
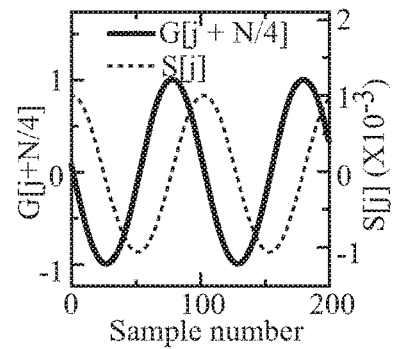
Figure 5E:
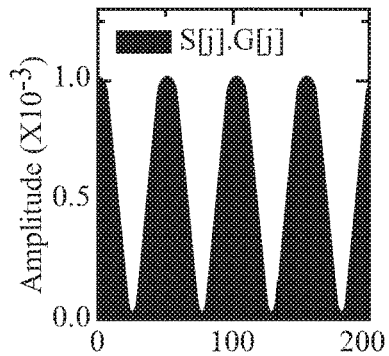
Figure 5F:
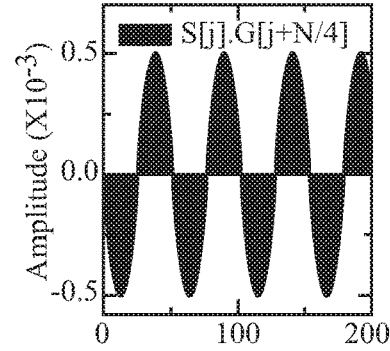
Figure 5G:
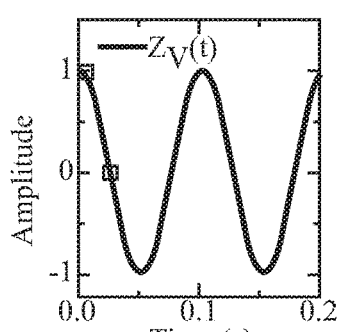

The Calibration routine—In the beginning, the system in tunneling (i.e. STM) is at rest and "strong" feedback parameters are used so that vibrations manifest, as much as possible, in the feedback signal $Z_{FB-}$ rather than remaining in the current. Any observed variations in $Z_{FB-}$ are associated with mechanical vibrations and it is expected that these will eventually be handled by the ANITA drive signal $Z_V$. FIGS. 5a-5g show ANITA's signal generation routines. As shown in FIG. 5a, the sinusoidal vibrations in G and $Z_{FB-}$, with collection-time-commensurate periods have a non-zero signal at a single frequency (see FIG. 5b). As discussed below, S (length N=1k points) is calculated via Eq. (2), then convolved continuously with G, shown here for cases when (FIG. 5c) they are in phase and (FIG. 5d) a quarter period later. Eq. (1) is inverted to choose the kernel as $$S \equiv \mathcal{F}^{-1}\left[\frac{\mathcal{F}(Z_{FB-})}{\mathcal{F}(G)}\right] \quad (2)$$

In practice the division is set equal to zero at frequencies where the geophone signal falls below a threshold at which level it is deemed that one is unable to accurately measure vibrations. The vibrations below this threshold are too weak to be accurately measured.

As discussed below, occasionally, the need to cancel multiple vibration frequencies may require the creation of multiple kernels. In this case, the zero-padded kernels are simply added together to create a "mega-kernel" $S^M$, though given the linear nature of the convolution they can be thought of as multiple processes operating in parallel. Thus, ANITA is operable to generate the correction signal by simultaneously convolving the sensor signal with multiple vibration frequencies.

2) The Signal Generation routine—In operation, ANITA generates, as shown in FIG. 4, the vibration signal $Z_V$ by convolving $S^M$ with the incoming digitized G signal:

$$Z_V \equiv G * S^M = \Sigma_{i=0}^{N-1} G[i] S^M[N-i] \tag{3}$$

where N is the kernel length. With each time step, G is shifted (prepending the newest data point and dropping the oldest) and the sum-product of Eq. (3) is used to determine the next value of $Z_V$, as depicted in FIG. 5. Although the discrete Fourier transform definitions of Eqs. (1) and (2) make clear the recovery of $Z_{FB-}$ through convolution of G with S, the sum-product of Eq. (3) is numerically equivalent and significantly easier and faster to perform. This is important as the algorithm should run at at least twice the frequency of the highest-detected vibration frequency to avoid aliasing effects[39]. One may typically run at 1 kHz. It should be noted that the algorithm may be run at other frequencies depending on the highest-detected vibration frequency and other associated parameters. The convolution involves taking the sum-product of G(t) and S(t) (the area under the curves in FIG. 5e and FIG. 5f to obtain FIG. 5g the vibration signal $Z_V$.

Example: ANITA's operation is further explicated by considering the case of a single vibration frequency f, appearing with amplitude A in the geophone, and leading to a vibration signal in $Z_{FB-}$ of amplitude AC. That is:

$$Z_{FB-}(t) = CG(t) = AC \cos(2\pi ft) \tag{4}$$

This signal is sampled at frequency $f_0$, leading to a sequence of readings:

$$G[j] = A \cos\left(2\pi f \frac{j}{f_0}\right) \text{ and } Z_{FB-}[j] = AC \cos\left(2\pi f \frac{j}{f_0}\right) \tag{5}$$

If N readings are made (i.e. if the calibration signals are captured for time $$\frac{N}{f_0})$$

and if the signal period is commensurate with the collection period $$(\text{i.e. } \frac{n}{f} = \frac{N}{f_0})$$

for integer n), then a Discrete Fourier Transform (DFT) of these signals yields particularly simple spectra, and a similarly straight forward Fourier kernel:

$$Z_{FB-}[k], G[k] = \begin{cases} AC, A & k = n, N-n \\ 0 & \text{otherwise} \end{cases} \tag{6}$$

$$\rightarrow S[k] \equiv \begin{cases} \frac{Z_{FB-}[k]}{G[k]} = C & k = n, N-n \\ 0 & \text{otherwise} \end{cases}.$$

During operation, this kernel is fed into the signal generation algorithm to find that it regenerates the vibration signal originally present in $Z_{FB}$, validating the functionality of the algorithm:

$$Z_V[j] = \sum_{m=0}^{N-1} G[j+m] \cdot S[N-m] = AC \cos\left(\frac{2\pi n j}{N}\right) = Z_{FB-}[j] \tag{7}$$

3) The Recalibration Routine

Figure 6A:
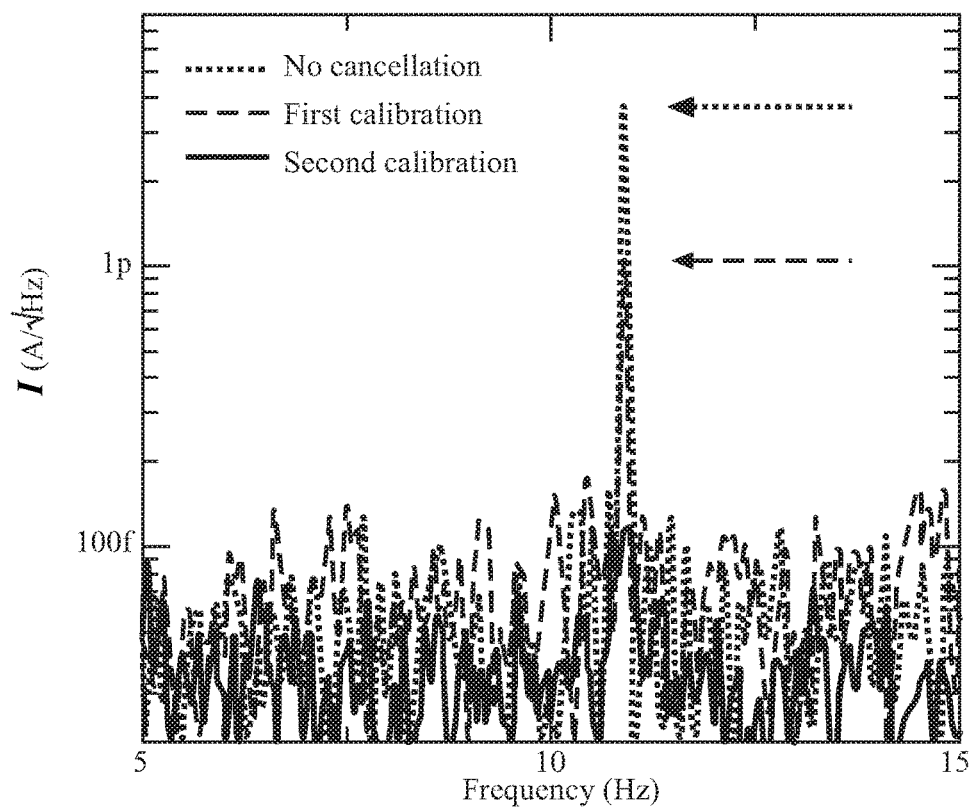
FIGS. 6*a*-6*b* graphically shows vibration reduction in a STM using ANITA.
Figure 6B:
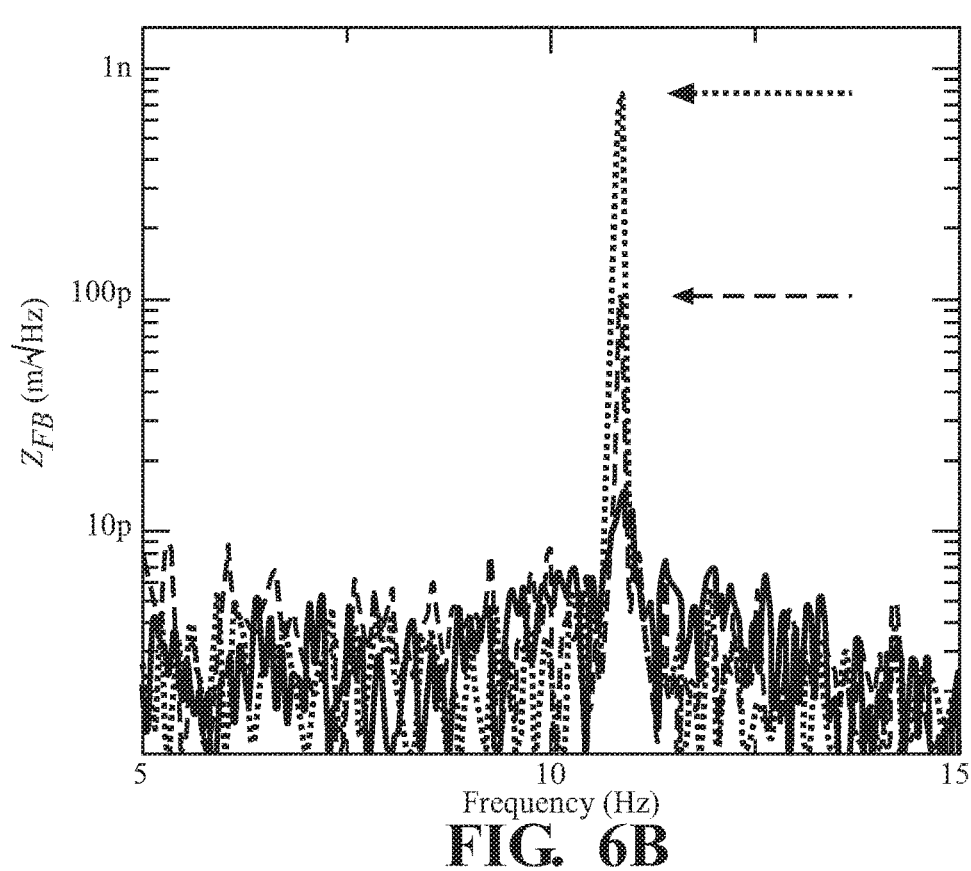

FIGS. 6a-6b graphically show vibration noise or signal reduction in a STM using ANITA. There may be a scenario when the feedback for $Z_{FB-}$ is not strong enough to completely cancel the relative tip-sample vibrational motion. That is, though $Z_{FB-}$ will contain some vibration related signal, some will remain in the current as well. In this scenario the kernel formed during the calibration routine fails to capture the entire vibration signature, reducing the method's effectiveness. This case is demonstrated in FIG. 6a, where insufficient constant current feedback leaves a vibration peak in the tip current (I) while ANITA cancellation is off (dotted line). As ANITA cancellation comes online (dashed line), removing the vibration signal from $Z_{FB}$, the feedback loop will then be able to further reduce the relative tip-sample motion, removing the vibration signal from the current and transferring it anew into $Z_{FB}$ (FIG. 6(b)).

Recalibration overcomes this limitation by using recursive ANITA calibration steps. Recalibration repeats this process, further reducing the remaining signatures of vibration (solid lines). Altogether, both Z and I vibration-related signals are reduced by nearly two orders of magnitude. The routine works by doing a calibration while ANITA is already running (creating a new kernel with $Z_{FB+}$ and G). Using the additive property of linear convolution[39] one can simply add this new kernel to the original kernel $S^M$ to improve cancellation. This recalibration process can be repeated multiple times until the entire vibrational signal is transferred to $Z_V$. FIG. 6 shows the result of two successive calibration steps, where the feedback is originally too weak to completely remove the vibration signal from the current (that is, too weak to actually prevent relative tip-sample motion). Note that each round of calibration transfers the vibration signal from $Z_{FB}$ to $Z_V$, allowing the feedback system to then further reduce the vibration signal in the current by transferring it into $Z_{FB}$.

III. Discrete Signal Analysis

Figure 7:
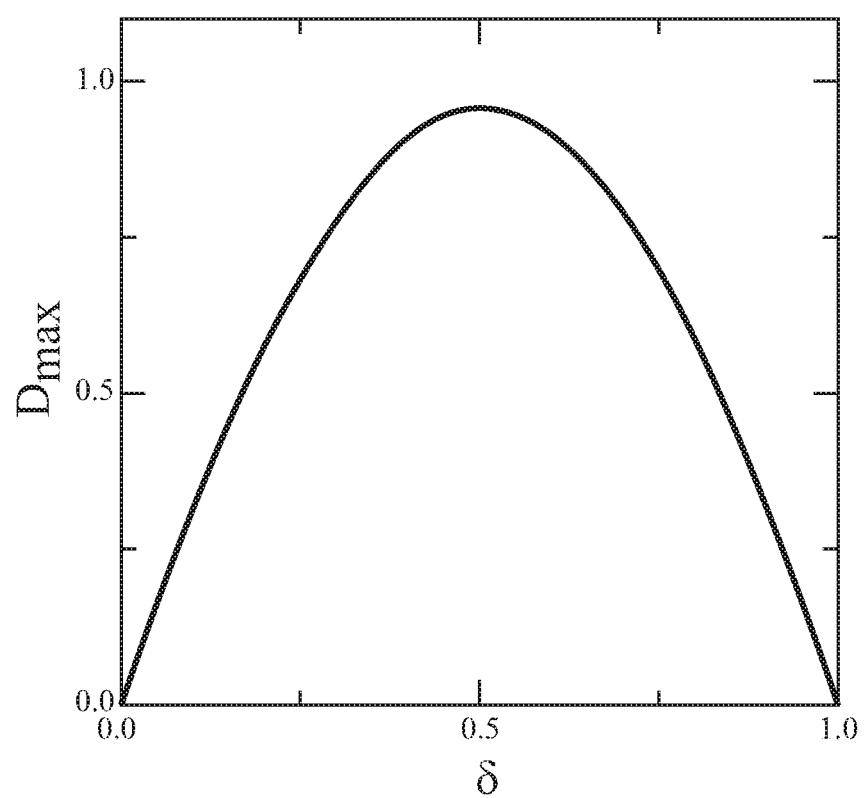
FIG. 7 is a graph of calibration time verses reproduction error.

The implementation of the signal generation routine using convolution is mostly straight forward, as depicted in section III. However, the discrete nature of the technique has important consequences for ANITA's effectiveness. In particular, the relationship between kernel length N and the period of the vibrations being cancelled directly determines the routine's effectiveness. To demonstrate, refer to the above-discussed example in a more generic fashion, allowing the still single-frequency vibration to have a period incommensurate with the calibration time period. FIG. 7 is a graph showing the relationship between ANITA's calibration time verses reproduction error. Rather than possessing a non-zero signal in a single frequency bin, this leads to DFTs with non-zero values in multiple consecutive frequency bins. Here, n is defined as the frequency bin just below the frequency center, as well as the fractional distance of the frequency center from n, and δ, as $$n \equiv \left\lfloor \frac{Nf}{f_0} \right\rfloor \text{ and } \delta \equiv \frac{Nf}{f_0} - n \quad (8)$$

The effectiveness of the kernel calculated for this time period can be determined as a function of δ by using it in Eq. (6) to calculate $Z_V$ and then comparing the result to the input $Z_{FB-}$ Signal. It is found that $Z_V$ no longer perfectly tracks $Z_{FB}$, varying from it in a time dependent fashion, and characterize these variations with $D_{max} \equiv \max\{Z_{FB-}[j] - Z_V[j]\}/\max\{Z_{FB-}[j]\}$, where the maximum is found over multiple j values, corresponding to several vibration periods. As demonstrated previously, $D_{max}=0$ for normalization period commensurates signals (δ=0), but as pictured in FIG. 7, it grows dramatically away from commensuration, peaking at δ=½. FIG. 7 shows signal reproduction inaccuracy for ANITA. As the vibration period 1/f moves away from commensuration with the calibration time (as characterized by δ), the normalized reproduction error grows, peaking at maximum incommensuration (δ=½). The pictured values were calculated for $f_0=1000$ Hz, N=1000 ($T_{Calibration}=1$ s) and f=(10+δ) Hz. Though the magnitude of variations depends slightly on the detailed choice of sampling frequency and calibration time, the dependence on incommensuration holds over a wide variety of values, always peaking near 100% error.

Figure 8B:
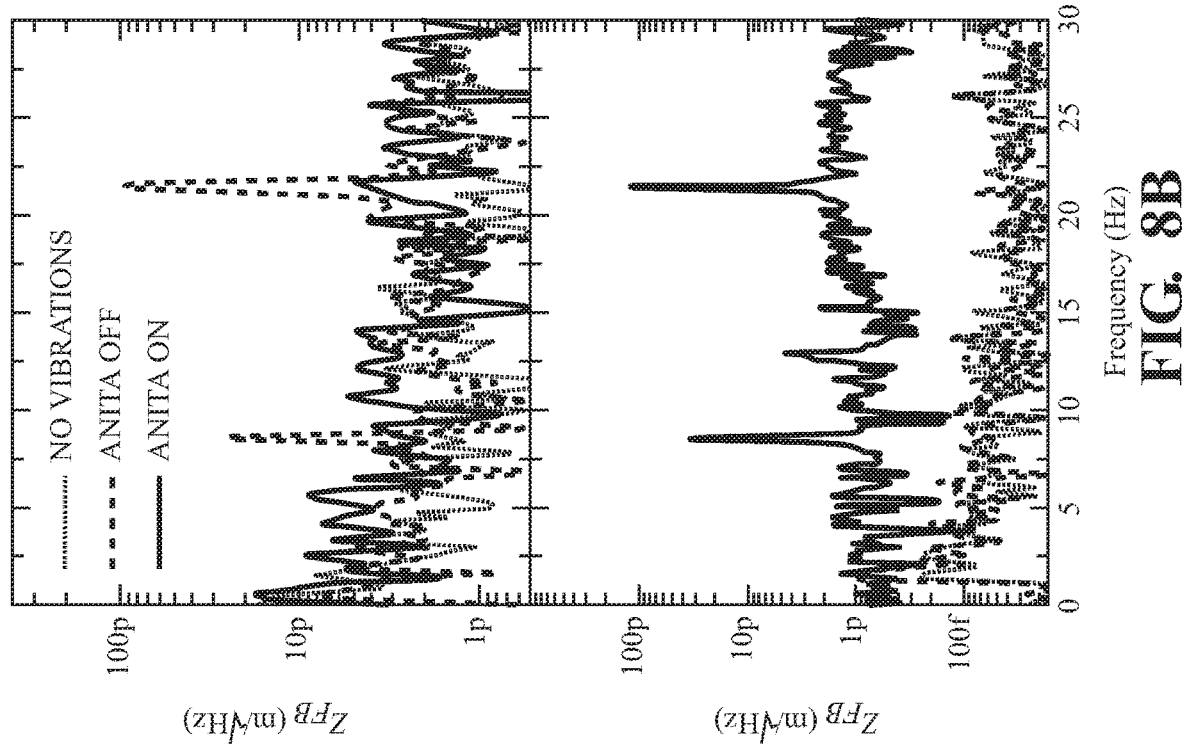
FIGS. 8*a*-8*b* are graphical representations of ANITA's effect.
Figure 8A:
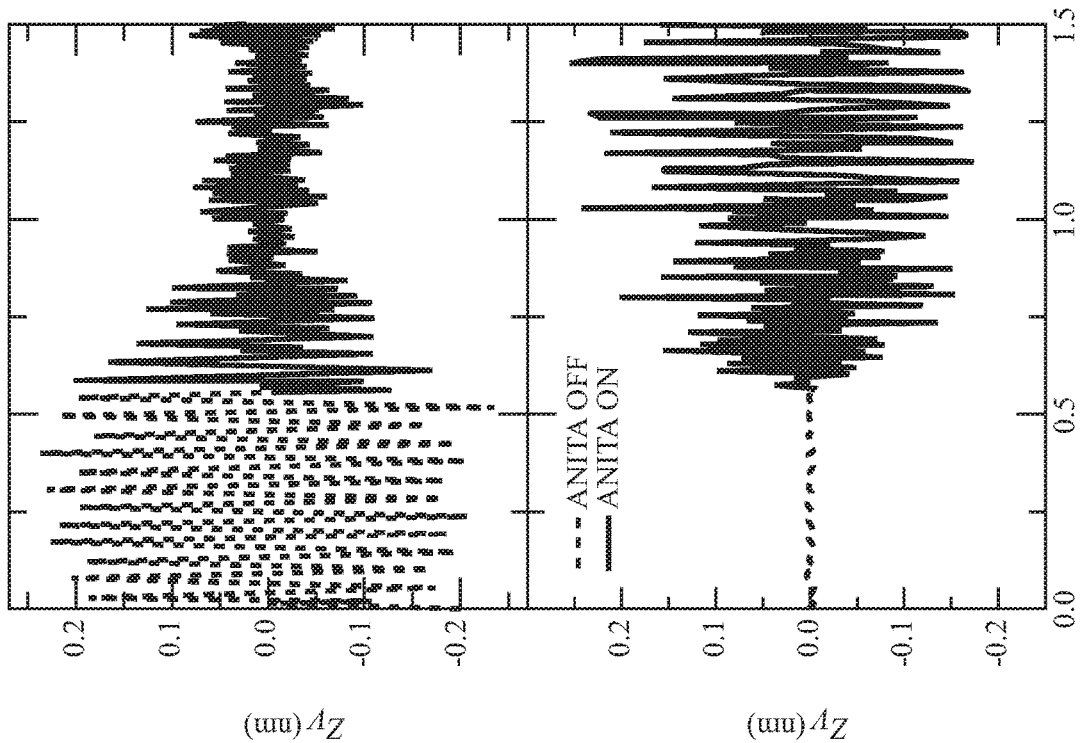

Given the results shown in FIG. 7, it is important to choose calibration periods (kernel lengths N) that minimize δ for each detected vibration frequency respectively. This, however, is not a problem, as the convolution (Eq. (3)) is linear, meaning that kernels of different lengths can simply be zero-padded to the same length, then added together. As accelerometer data comes in, each piece of the kernel essentially independently handles the vibration periods commensurate with its length. The success of this technique is depicted in FIG. 8, where two incommensurate vibrations are simultaneously reduced. FIG. 8a is a time trace showing the transfer of vibration signal from $Z_{FB-}$ (upper section of FIG. 8a) to $Z_V$ (lower section of FIG. 8a). FIG. 8b is a frequency spectrum of the FIG. 8a, depicting the reduction of two incommensurate peaks present in $Z_{FB-}$ close to 8 Hz and 21.2 Hz before cancellation and their appearance in $Z_V$ after cancellation.

Figure 9:
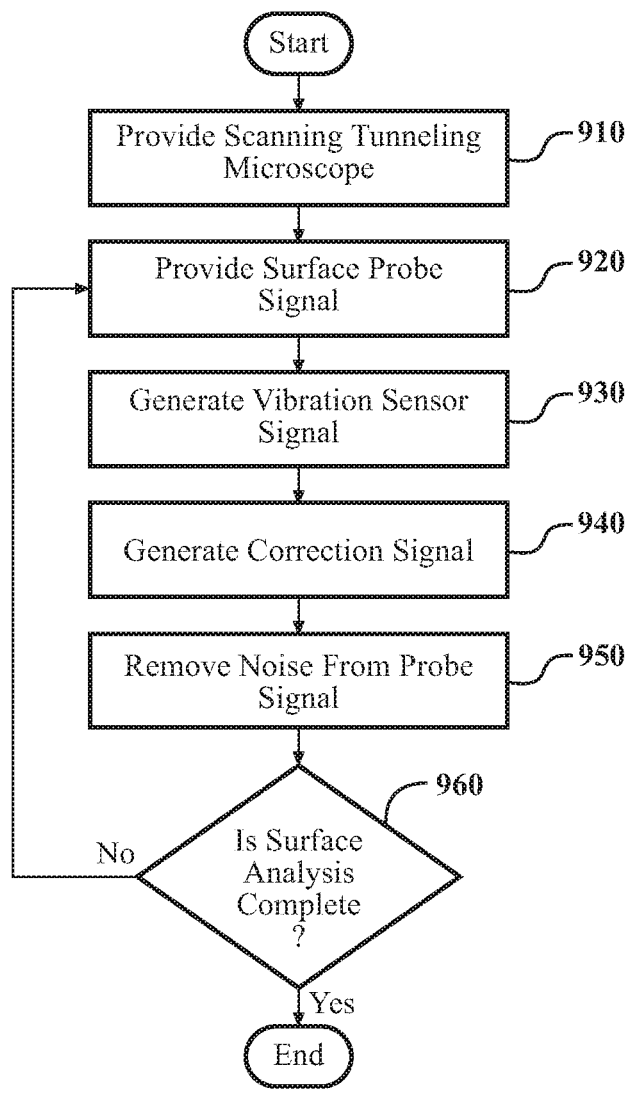
FIG. 9 is a flow chart of ANITA's method embodiment.

The present invention also discloses a method of active noise isolation for a scanning tunneling microscope. FIG. 9 shows a flow chart of ANITA's method embodiment. The method includes a step of providing a scanning tunneling microscope 910 fitted with ANITA. Various embodiments of STM with ANITA that may be provided for step 910 have been discussed above in this disclosure. Other steps according to the method embodiment include: providing a surface probe signal 920 from the probe based on the surface of the sample disposed on the sample holder of the scanning tunneling microscope; generating a vibration sensor signal 930 based on the ambient vibration; generating a correction signal 940 from the processing unit by convolution based on the probe signal and the sensor signal; and removing noise of the ambient vibration 950 from the probe signal using the processing unit by applying the correction signal to the probe signal. The ambient vibration creates the relative motion between the probe and the sample surface, and the relative motion due to the ambient vibration adds noise to the probe signal. After performing all the above steps, the scanning tunneling microscope determines if the surface analysis of the sample is complete at step 960. If yes, the process described according to the method comes to an end. However, if the surface analysis is incomplete, the process may revert back to other steps, e.g. to providing surface probe signal 920 or to other suitable steps.

In some method embodiments, the step of generating the correction signal 940 comprises continuous or periodical monitoring of an amplitude and/or frequency of the ambient vibration to remove the noise. In other method embodiments, the step of generating the sensor signal 930 is based on the ambient vibration having a plurality of frequencies and amplitudes. In these embodiments, during the step of generating the correction signal 940 the processing unit simultaneously convolves the plurality of frequencies and amplitudes of the ambient vibration.

Some other method embodiments may further comprise a step of detecting a highest frequency of the ambient vibration, wherein the step of generating the correction signal 940 comprises running a discrete algorithm at a frequency that is at least twice the highest frequency of the ambient vibration. The step of detecting the highest frequency of the ambient vibration may be performed either during the step of generating vibration sensor signal 930 or generating correction signal 940. In some method embodiments, the step of providing the scanning tunneling microscope 910 includes providing the sensor comprising a plurality of sensors. In a method embodiment according to this disclosure, the step of generating the correction signal 940 may comprise generating one or more kernels for each frequency in the ambient vibration for convolution.

It should be noted that a person skilled in the art may use the method of active noise isolation by following the steps in a different order than shown in FIG. 9. In a non-limiting example, step 920 of the method may be performed before step 910 and vice versa.

IV. Conclusion

The above discussion shows successful implementation of ANITA, an easy to implement vibration cancellation system for Scanning Probe Microscopes. The process works by detecting mechanical vibrations affecting the STM system using a geophone and from that creating a vibration cancellation signal that removes the vibration signal from the recorded Z motion of the tip. A kernel S generated during the calibration routine is utilized to translate from the geophone signal G to vibration cancelling $Z_V$ using continuous convolution. Recalibration may be used when the constant current feedback is too weak to remove the vibration signal from the current. Although the above discussion of ANITA currently discusses Z-axis motion, it should be noted that a person skilled in the art may use these teachings to extend both measurement and control of the STM system to all three dimensions. The above discussion of the STM system successfully demonstrates more than an order of magnitude reduction of vibration peak amplitude. This technique could prove to be of great importance in enabling the use of SPMs in noisy environments.

It will be apparent to those skilled in the art that various modifications and variations can be made in the present invention without departing from the spirit or scope of the inventions. Thus, it is intended that the present invention covers the modifications and variations of this invention. The present invention has been described with reference to some embodiments. However, it is realized that variants and equivalents to the preferred embodiments may be provided without departing from the scope of the invention as defined in the accompanying claims. It is to be understood that the detailed description of the present invention are exemplary and explanatory and are intended to provide further explanation of the invention. It is not intended to be exhaustive or to limit embodiments to the precise form disclosed. As such, this disclosure should be interpreted broadly.

REFERENCES

[1] G. Binnig, H. Rohrer, C. Gerber, and E. Weibel, Phys. Rev. Lett. 49, 57 (1982).
[2] A. I. Oliva, V. Sosa, R. de Coss, R. Sosa, N. López Salazar, and J. L. Peña, Rev. Sci. Instrum. 63, 3326 (1992).
[3] J. A. Stroscio and William J. Kaiser, *Scanning Tunneling Microscopy* (Academic Press, INC, 1993).
[4] R. Wiesendanger, *Scanning Probe Microscopy and Spectroscopy* (Cambridge University Press, 1994).
[5] E. W. Hudson, R. W. Simmonds, C. A. Yi Leon, S. H. Pan, and J. C. Davis, Czechoslov. J. Phys. 46, 2737 (1996).
[6] S. H. Pan, E. W. Hudson, and J. C. Davis, Rev. Sci. Instrum. 70, (1999).
[7] L. Libioulle, A. Radenovic, E. Bystrenova, and G. Dietler, Rev. Sci. Instrum. 74, 1016 (2003).
[8] T. Hanaguri, J. Phys.: Conf. Ser. 51, 514 (2006).
[9] C. R. Ast, M. Assig, A. Ast, and K. Kern, Rev. Sci. Instrum. 79, (2008).
[10] Y. J. Song, A. F. Otte, V. Shvarts, Z. Zhao, Y. Kuk, S. R. Blankenship, A. Band, F. M. Hess, and J. A. Stroscio, Rev. Sci. Instrum. 81, (2010).
[11] M. L. Cummings, T. Y. Chien, C. Preissner, V. Madhavan, D. Diesing, M. Bode, J. W. Freeland, and V. Rose, Ultramicroscopy 112, 22 (2012).
[12] M. Okano, K. Kajimura, S. Wakiyama, F. Sakai, W. Mizutani, and M. Ono, J. Vac. Sci. Technol. A 5, 3313 (1987).
[13] M. Schmid and P. Varga, Ultramicroscopy 42-44, 1610 (1992).
[14] J. M. Hensley, A. Peters, and S. Chu, Rev. Sci. Instrum. 70, 2735 (1999).
[15] D. Croft and S. Devasia, Rev. Sci. Instrum. 70, 4600 (1999).
[16] D. P. Fogarty, A. L. Deering, S. Guo, Z. Wei, N. A. Kautz, and S. A. Kandel, Rev. Sci. Instrum. 77, (2006).
[17] H. Liu, Y. Meng, H. W. Zhao, and D. M. Chen, Rev. Sci. Instrum. 78, (2007).
[18] A. Fang, Scanning Tunneling Microscope Studies of the High Temperature Superconductor BSCCO, Stanford University, 2008.
[19] K. Iwaya, R. Shimizu, T. Hashizume, and T. Hitosugi, Rev. Sci. Instrum. 82, (2011).
[20] A. M. J. den Haan, G. H. C. J. Wijts, F. Galli, O. Usenko, G. J. C. van Baarle, D. J. van der Zalm, and T. H. Oosterkamp, Rev. Sci. Instrum. 85, 1 (2014).
[21] W. Tao, S. Singh, L. Rossi, J. W. Gerritsen, B. L. M. Hendriksen, A. A. Khajetoorians, P. C. M. Christianen, J. C. Maan, U. Zeitler, and B. Bryant, Rev. Sci. Instrum. 88, (2017).
[22] D. W. Abraham, C. C. Williams, and H. K. Wickramasinghe, Appl. Phys. Lett. 53, 1503 (1988).
[23] A. Kandori, T. Miyashita, and K. Tsukada, Rev. Sci. Instrum. 71, 2184 (2000).
[24] P. J. M. Woltgens and R. H. Koch, Rev. Sci. Instrum. 71, 1529 (2000).
[25] F. Douarche, L. Buisson, S. Ciliberto, and A. Petrosyan, Rev. Sci. Instrum. 75, 5084 (2004).
[26] T. Suzuki, T. Tomaru, T. Haruyama, T. Shintomi, N. Sato, A. Yamamoto, Y. Ikushima, and R. Li, AIP Conf. Proc. 823, 1325 (2006).
[27] C. J. Dedman, R. G. Dall, L. J. Byron, and A. G. Truscott, Rev. Sci. Instrum. 78, (2007).
[28] S C. Collette, S. Janssens, and K. Artoos, Recent Patents Mech. Eng. 4, (2011).
[29] J. C. Driggers, M. Evans, K. Pepper, and R. Adhikari, Rev. Sci. Instrum. 83, (2012).
[30] S. Zimmermann, Nucl. Instruments Methods Phys. Res. A 729, 404 (2013).
[31] B. Tang, L. Zhou, Z. Xiong, J. Wang, and M. Zhan, Rev. Sci. Instrum. 85, (2014).
[32] Y. Yu, Y. Wang, and J. R. Pratt, Rev. Sci. Instrum. 87, (2016).
[33] A. D'Addabbo, C. Bucci, L. Canonica, S. Di Domizio, P. Gorla, L. Marini, A. Nucciotti, I. Nutini, C. Rusconi, and B. Welliver, arXiv:1712.02753 (2017).
[34] E. W. Hudson and L. Pabbi, U.S. Provisional Pat. Ser. No. 62/622,253 (2018).
[35] GS-11D Geophone by Geospace Technology Corporation 7007 Pinemont Drive, Houston, Texas 77040.
[36] National Instruments, 11500 N Mopac Expwy, Austin, Texas 78759-3504.
[37] LM741 Op-Amp Based Summing Amplifier, See Texas Instruments Application Note 31.
[38] Nanonis SPM Control System by SPECS Zurich GmbH, Technoparkstrasse 1, 8005 Zurich, Switzerland
[39] S. W. Smith, *The Scientist and Engineer's Guide to Digital Signal Processing* (1999).

The invention claimed is:
1. A scanning probe microscope, comprising:
an existing scanning probe microscope (SPM) including:
a sample holder for holding a sample with a surface;
a probe operable to provide a probe signal based on the surface of the sample disposed on the sample holder;
a sensor external to the existing SPM generating a sensor signal based on an ambient vibration, the sensor and probe signals being dimensionally-distinct physical quantities, the ambient vibration creating a relative motion between the probe and the sample surface, the relative motion due to the ambient vibration adding noise to the probe signal; and
a processing unit generating a correction signal by convolution involving dimensioned parameters to account for the sensor and probe being the dimensionally-distinct physical quantities and determining a relationship between the sensor signal and a displacement of the probe based on the probe signal and the sensor signal, the processing unit removing noise from the probe signal by applying the correction signal to the probe signal.

2. The scanning probe microscope of claim 1, wherein the sensor comprises a plurality of sensors.

3. The scanning probe microscope of claim 1, wherein the sensor is selected from a group of an accelerometer, velocity sensor, proximity sensor and laser displacement sensor.

4. The scanning probe microscope of claim 1, wherein the sensor is disposed at a location that is spaced from a location of the probe, sample holder and/or the surface of the sample.

5. The scanning probe microscope of claim 1, wherein the sensor is not physically attached or connected with the probe, sample holder and/or the surface of the sample.

6. The scanning probe microscope of claim 1, wherein the sensor generates the sensor signal based on the ambient vibration having a variable frequency and/or amplitude.

7. The scanning probe microscope of claim 1, wherein the scanning probe microscope includes a constant tip-current or constant tip-height based scanning probe microscope, and the processing unit, respectively, generates the correction signal for the constant tip-current or constant tip-height based scanning probe microscope.

8. The scanning probe microscope of claim 1, wherein the sensor detects a highest frequency of the ambient vibration and the processing unit generates the correction signal using a discrete algorithm that is run by the processing unit at a frequency that is at least twice the highest frequency of the ambient vibration.

9. The scanning probe microscope of claim 1, wherein the ambient vibration comprises a plurality of frequencies and amplitudes, and the sensor generates the sensor signal based on the ambient vibration comprising the plurality of frequencies and amplitudes.

10. The scanning probe microscope of claim 9, wherein the processing unit generates the correction signal by simultaneously convolving the sensor signal comprising the plurality of frequencies and amplitudes of the ambient vibration.

11. The scanning probe microscope of claim 1, wherein the processing unit removes noise of the ambient vibration corresponding to a plurality of axes along the probe, sample holder and/or the surface of the sample.

12. The scanning probe microscope of claim 1, wherein the processing unit generates the correction signal using digital signal processing.

13. The scanning probe microscope of claim 1, wherein the processing unit does not generate the correction signal using analog signal processing.

14. A method of active noise isolation for a scanning probe microscope, comprising the steps:
providing a scanning probe microscope;
providing the probe signal from the probe based on the surface of the sample disposed on the sample holder;
providing an external sensor external to the existing SPM generating a sensor signal based on an ambient vibration, the sensor and probe signals being dimensionally-distinct physical quantities;
generating the sensor signal from the sensor based on the ambient vibration, the ambient vibration creating the relative motion between the probe and the sample surface, and the relative motion due to the ambient vibration adding noise to the probe signal;
generating the correction signal from the processing unit by convolution involving dimensioned parameters to account for the sensor and probe being the dimensionally-distinct physical quantities and determining a relationship between the sensor signal and a displacement of the probe based on the probe signal and the sensor signal; and
removing the noise of the ambient vibration from the probe signal using the processing unit by applying the correction signal to the probe signal.

15. The method of claim 14, wherein the step of generating the correction signal comprises continuous or periodical monitoring of an amplitude and/or frequency of the ambient vibration to remove the noise.

16. The method of claim 14, wherein the step of generating the sensor signal is based on the ambient vibration having a plurality of frequencies and amplitudes.

17. The method of claim 16, wherein during the step of generating the correction signal the processing unit simultaneously convolves/convolutes the plurality of frequencies and amplitudes of the ambient vibration.

18. The method of claim 14, further comprising a step of detecting a highest frequency of the ambient vibration, wherein the step of generating the correction signal comprises running a discrete algorithm at a frequency that is at least twice the highest frequency of the ambient vibration.

19. The method of claim 14, wherein the step of providing the scanning probe microscope includes providing the sensor comprising a plurality of sensors.

20. The method of claim 14, wherein the step of generating the correction signal comprises generating one or more kernels for each frequency in the ambient vibration for convolution.

* * * * *